United States Patent [19]

van der Lely et al.

[11] 3,885,633

[45] May 27, 1975

[54] SOIL CULTIVATING IMPLEMENTS OR HARROWS

[76] Inventors: Cornelis van der Lely, 7, Bruschenrain, Zug, Switzerland; Ary van der Lely, 10, Weverskade, Maasland; Cornelis Johannes Gerardus Bom, 36, Esdoornlaan, Rozenburg, both of Netherlands

[22] Filed: June 14, 1973

[21] Appl. No.: 369,907

[30] Foreign Application Priority Data

Apr. 18, 1973 Netherlands ...................... 7305416

[52] U.S. Cl. .................... 172/68; 172/79; 172/117; 172/240; 172/311

[51] Int. Cl. ........................................... A01b 33/06

[58] Field of Search ............ 172/49, 59, 63, 68, 71, 172/72, 78, 79, 240, 243, 117, 311

[56] References Cited

UNITED STATES PATENTS

| | | | |
|---|---|---|---|
| 510,143 | 12/1893 | Kelsey et al. | 172/117 X |
| 2,123,972 | 7/1938 | Simpson | 172/78 |
| 2,961,249 | 11/1960 | Petersen et al. | 172/240 X |
| 3,202,221 | 8/1965 | Monk et al. | 172/63 |
| 3,511,318 | 5/1970 | Boetto et al. | 172/240 |
| 3,530,944 | 9/1970 | Spell | 172/103 X |
| 3,616,862 | 11/1971 | van der Lely | 172/59 X |
| 3,774,689 | 11/1973 | van der Lely et al. | 172/776 X |

FOREIGN PATENTS OR APPLICATIONS

| | | | |
|---|---|---|---|
| 701,542 | 1/1965 | Canada | 172/240 |
| 6,706,636 | 11/1968 | Netherlands | 172/59 |

*Primary Examiner*—Edgar S. Burr
*Assistant Examiner*—Paul T. Sewell
*Attorney, Agent, or Firm*—Mason, Mason & Albright

[57] ABSTRACT

A cultivator implement has an upper supporting frame of interconnected, spaced-apart beams that extend across the width of the implement. Two groups of soil working members are independently supported from said frame with respective linkages that connect a frame portion of each group to said beams and each frame portion supports driving means that rotates the shafts of depending soil working members. The frame portions are interconnected by stabilizing rods or cranks that permit relative vertical movements. A soil contacting roller is adjustably connected at the rear of the frame portions to regulate the working depths of the working members, and a chain interconnects the beams with the rears of the frame portions to limit the downward movement of same when the implement is transported. A coupling member at the center of the implement connects to the rear of a prime mover. Transport position of the implement can be effected by securing a wheeled support to brackets at one end of the supporting frame. The opposite end of the frame has sleeve connections to receive a draw bar that can be rested on the ground.

28 Claims, 10 Drawing Figures

Figure 2:
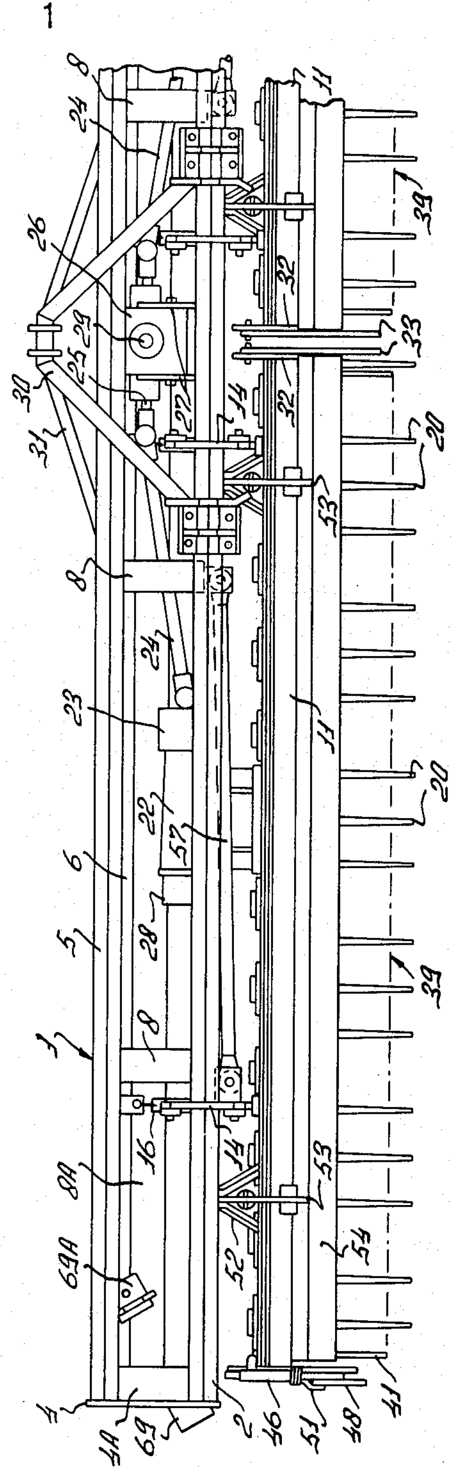

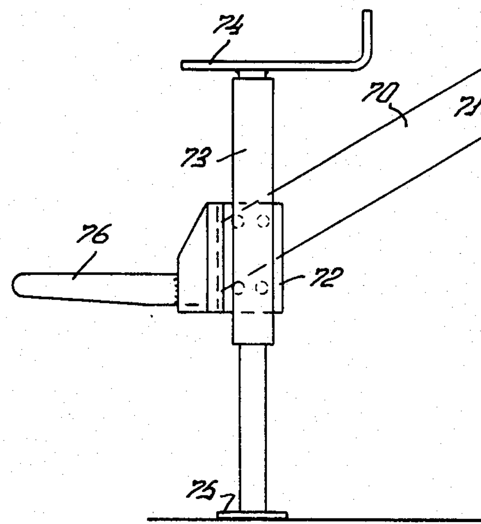
FIG. 6
74
73
70
71A
76
72
75
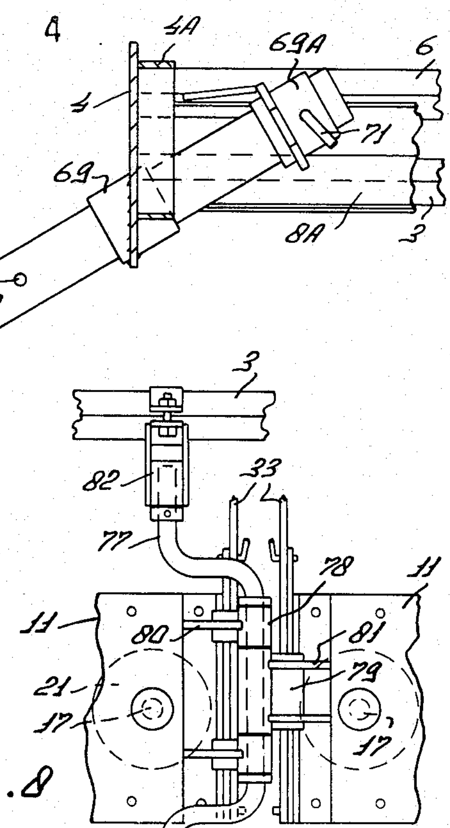
4A
69A
6
4
71
69
8A
3
33
82
77
78
11
80
81
21
79
17
FIG. 8
2
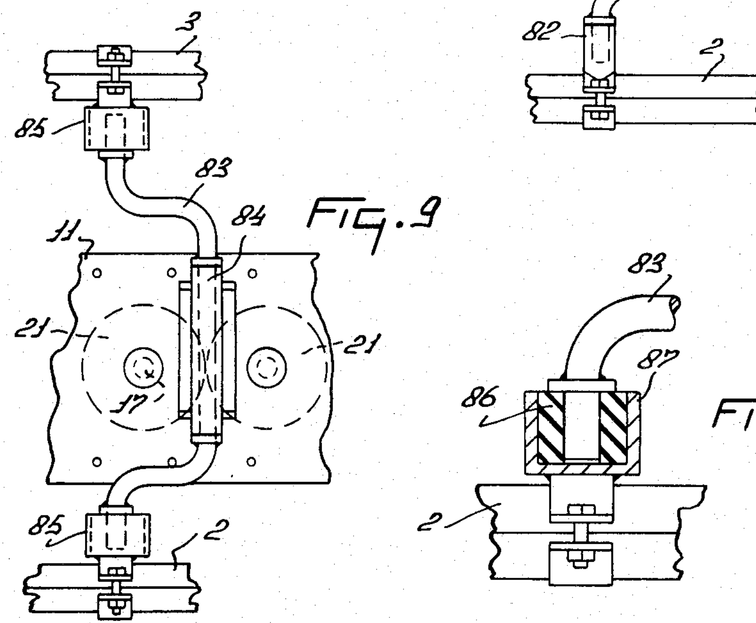
3
85
83
84
FIG. 9
11
21
17
2
87
86
FIG. 10

SOIL CULTIVATING IMPLEMENTS OR HARROWS

According to the invention, there is provided a soil cultivating implement or harrow of the kind set forth, wherein each group of soil working members or rotors is supported in such a way as to enable the whole group to be upwardly and downwardly movable during the operation of the implement of harrow.

For a better understanding of the invention, and to show how the same may be carried into effect, reference will now be made, by way of example, to the accompanying drawings, in which:-

Figure 1:
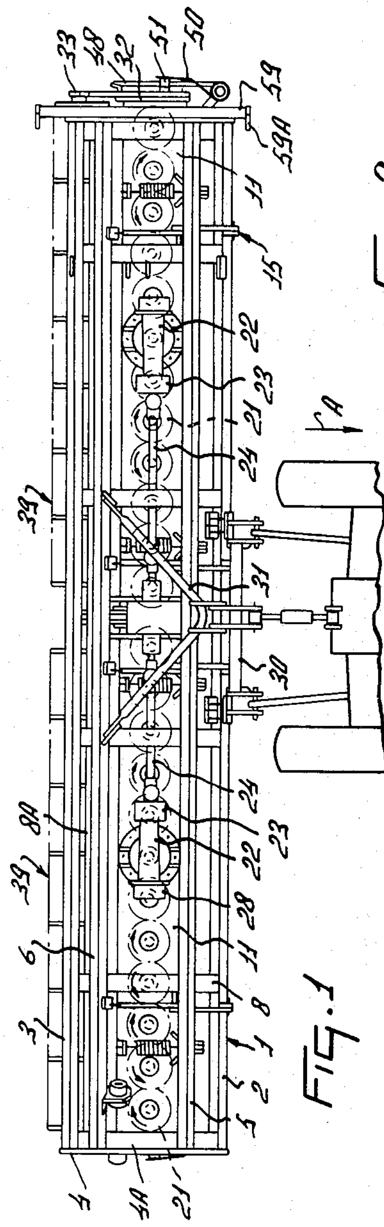
Figure 3:
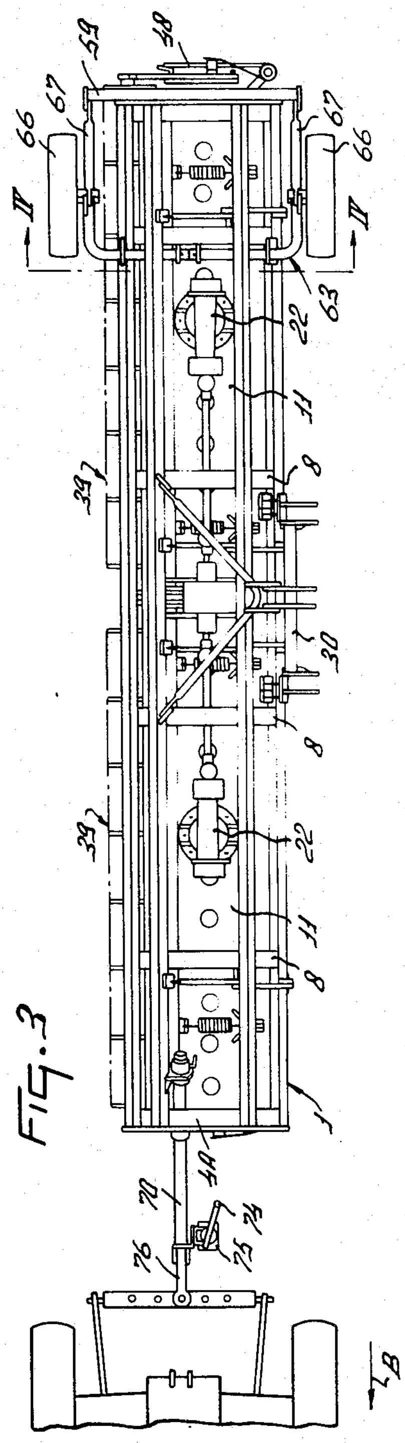
Figure 7:
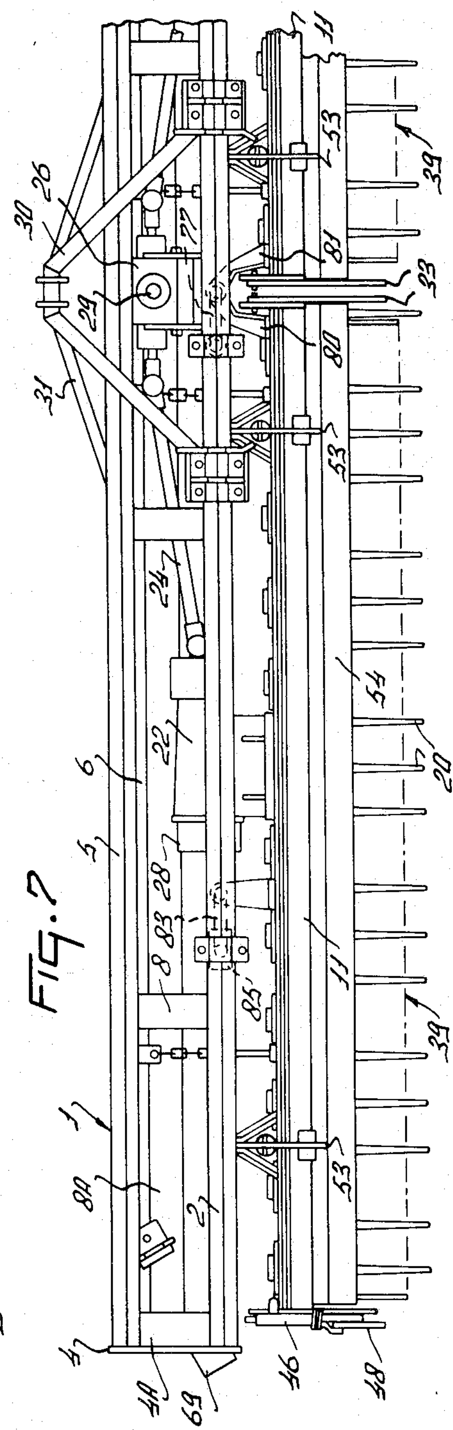
Figure 4:
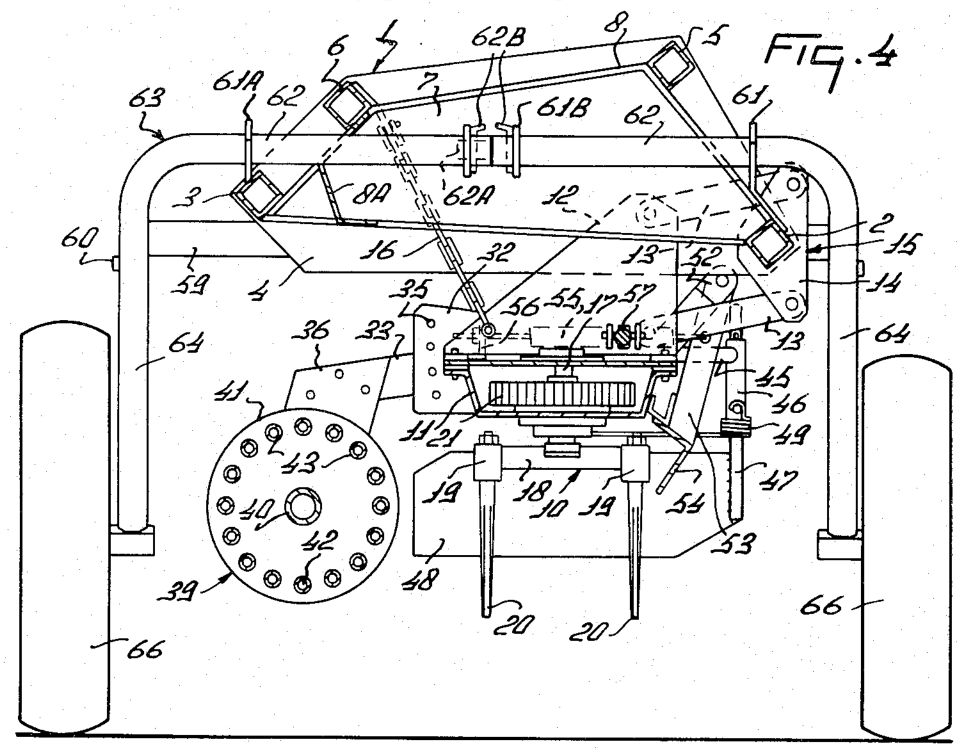
Figure 5:
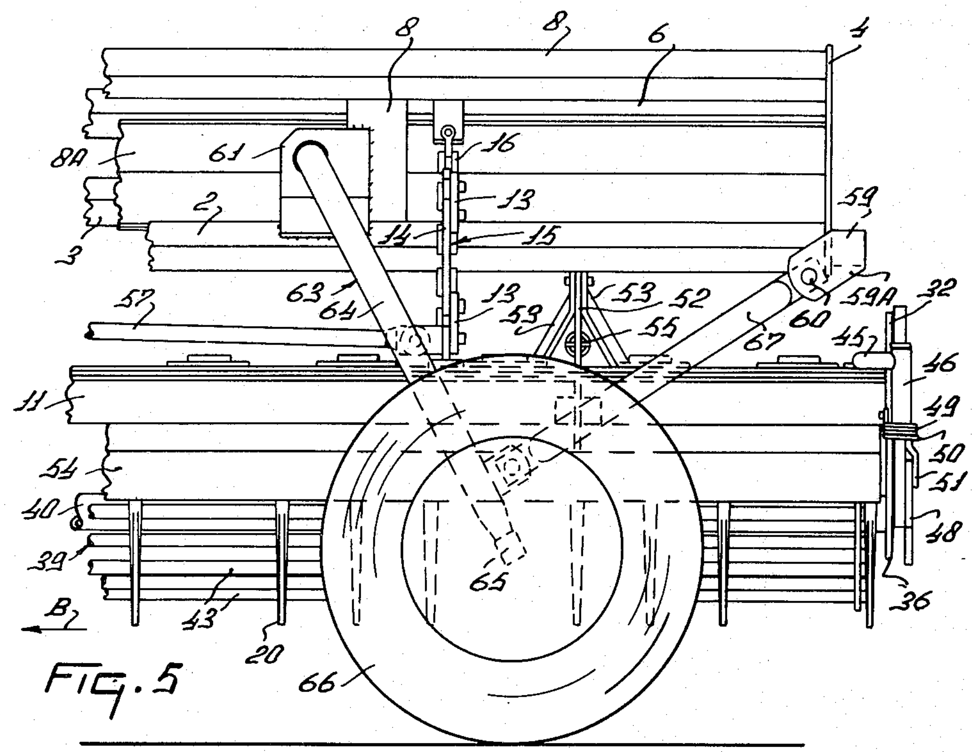

FIG. 1 is a plan view of a soil cultivating implement or rotary harrow in accordance with the invention coupled to the rear of an agricultural tractor, FIG. 2 is a partial front elevation, to an enlarged scale, of the implement or harrow of FIG. 1, FIG. 3 is a plan view to the same scale as FIG. 1 showing the implement or harrow connected to the rear of a tractor and occupying a position suitable for the inoperative transport thereof, FIG. 4 is a section, to an enlarged scale, taken on the line IV—IV of FIG. 3, FIG. 5 is a partial side elevation of the FIG. 4, FIG. 6 is a partial elevation, to an enlarged scale, of the ground support attached to the front of the implement in FIG. 3, FIG. 7 corresponds to FIG. 2 but illustrates an alternative construction for some parts of the implement or harrow, FIG. 8 is a scrap plan view, to an enlarged scale, showing the construction and arrangement of parts located at the junctions between two frame portions of the implement or harrow of FIG. 7, FIG. 9 is similar to FIG. 8 but shows the construction and arrangement of supporting parts located adjacent the free end of one of said frame portions of the implement or harrow of FIG. 7, and FIG. 10 is a plan view, partly in section and to an enlarged scale, showing an alternative construction for an assembly that is illustrated in FIG. 9, Referring to FIGS. 1 to 6 of the drawings, the soil cultivating implement or rotary harrow that is illustrated has a supporting frame 1 that extends substantially horizontally and substantially perpendicularly transverse to the intended direction of operative travel of the implement or harrow that is indicated by an arrow A in FIG. 1. The supporting frame 1 comprises two parallel beams 2 and 3 that are located at the front and rear of the frame respectively relative to the direction A, each of the beams 2 and 3 being of an angular cross-section and preferably of the square cross-section, that is illustrated. With this preferred cross-section, each beam is disposed so that a diagonal between two of its opposite corners extends substantially vertically (see FIG. 4). It can also be seen in FIG. 4 that the leading frame beam 2 with respect to the direction A is located at a slightly lower level than the rearward frame beam 3, the corresponding ends of the two beams 2 and 3 being interconnected by substantially vertical plates 4 that extend substantially parallel to the direction A. The relatively facing surfaces of the two plates 4 that are located at the opposite ends of the beams 2 and 3 are provided with perpendicularly projecting rims 4A which afford anchorages for the ends of further frame beams 5 and 6 that extend parallel to the beams 2 and 3 and that are of similar cross-sectional shape and disposition. Both of the further frame beams 5 and 6 are located at a higher level than the beams 2 and 3 and the foremost beam 5 thereof with respect to the direction A is disposed at a slightly higher level than the beam 6. The perpendicular distance between the beams 2 and 5 is greater than the perpendicular distance between the beams 3 and 6. Plate-like supports 7 that extend substantially parallel to the plates 4 interconnect the frame beams 2, 3, 5 and 6 at regular intervals along the lengths of those beams, said supports 7 having perpendicular rims 8 around their peripheries which rims are employed to produce rigid supporting conncetions with the beams, 2, 3, 5 and 6. An angular cross-section strip 8A interconnects rear regions of the plates 4 and the supports 7 with respect to the direction A, said strip 8A extending parallel to the beams 2, 3, 5 and 6 and being rigidly secured to the rims 4A and 8 of the plates 4 and supports 7 respectively.

Beneath the supporting frame 1, there are two normally substantially horizontally aligned hollow frame portions 11 that extend substantially parallel to the frame beams 2, 3, 5 and 6 and each of which carries a corresponding group of soil working members or rotors 10. The two frame portions 11 substantially adjoin one another at the center of the supporting frame 1 of the implement or harrow as can be seen most clearly in FIG. 2 of the drawings. Each frame portion 11 is provided at distances from both its ends with corresponding substantially vertical brackets 12 that are of generally triangular configuration (see FIG. 4) and whose lowermost edges extend throughout the breadth (in the direction A) of the corresponding frame portions 11. The brackets 12 taper upwardly and their leading edges with respect to the direction A are substantially vertically disposed. The brackets 12 that are nearest to the neighbouring ends of the frame portions 11 at the center of the implement or harrow are considerably closer to those ends than are the brackets 12 that are disposed towards the opposite ends of said frame portions 11 (See FIG. 2). Each bracket 12 has a corresponding pair of arms 13 pivotally connected to it towards its leading substantially vertical edge with respect to the direction A, the arms 13 being located one above the other in vertically spaced relationship. The opposite foremost ends of each pair of arms 13 are pivotally connected to corresponding supports 14 that are secured to the leading beam 2 of the frame 1. As can be seen in FIG. 4 of the drawings, the pivotally interconnected brackets 12, arms 13 and supports 14 constitute parallelogram linkages 15 by means of which the frame portions 11 can move freely upwardly and downwardly relative to the supporting frame 1 during the operation of the cultivating implement or harrow. Chains 16 extend between the frame beam 6 and anchorages on the respective brackets 12 and prevent the frame portions 11 from moving too far downwardly relative to the supporting frame 1, the lowermost positions which the frame portions 11 can reach corresponding to the fully tensioned dispositions of the chains 16 that are shown in respect of one of them in FIG. 4 of the drawings.

Substantially vertical bearings rotatably mount twelve substantially vertical, or at least upright, shafts 17 in each of the two hollow generally box-shaped frame portions 11 in corresponding rows in which the shafts 17 are regularly spaced apart from one another by distances that are preferably substantially 25 centimeters. The shafts 17 afford the axes of rotation of the corresponding soil working members or rotors 10 each of which latter has a substantially horizontal tine support 18 whose central region is rigidly fastened to the lowermost end of the corresponding shaft 17 that projects from beneath the frame portion 11 concerned. The opposite ends of each tine support 18 are provided with substantially vertical sleeve-like tine holders 19 in which fastening portions of corresponding rigid tines 20 are secured by tightening corresponding nuts. The tines 20 project downwardly from the holders 19 and each of them has a lower soil working portion which is inclined rearwardly by a few degrees relative to the intended direction of rotation of the soil working member 10 concerned so that the tines 20 can be considered as "trailing" with respect to the directions of rototation of the soil working members or rotors 10 of which they form parts, said directions of rotation being indicated by arrows in FIG. 1 of the drawings. The distances between the tips of the soil working portions of the tines 20 of each member or rotor 10 are a little greater than the distances between the axes of rotation afforded by the shaft 17 so that, during operation of the implement or harrow, the strips of land that are worked by the individual members or rotors 10 overlap one another to form, in effect, a single broad strip of cultivated or harrowed soil. Each shaft 17 is provided, inside its corresponding frame portion 11, with a corresponding straight- or spur-toothed pinion 21 (FIG. 4), the pinions 21 being arranged in such a way that the teeth of each pinion are in mesh with those of its neighbour or both of its neighbours. The shafts 17 corresponding to two soil working members or rotors 10 that are located substantially centrally of the two frame portions 11 each have upward extensions into corresponding gear boxes 22 that are located on top of the two frame portions 11. Each shaft extension is provided inside the corresponding gear box 22, with a bevel pinion whose teeth are in driven mesh with those of a further bevel pinion mounted on a substantially horizontal shaft that is substantially parallel to the length of the frame portion 11 concerned (i.e. substantially perpendicular to the direction A). Each of the last-mentioned shafts projects from the corresponding gear box 22, the projecting portion being provided with a further pinion that is in driven mesh with a pinion carried by a shaft that is at a higher level than, but parallel to, the last-mentioned shaft. Each of the upper shafts is connected, via a corresponding slip clutch or other overload safety coupling 23 and a telescopic transmission shaft 24 having universal joints at its opposite ends, to one or the other end of a substantially horizontal shaft 25 that is substantially parallel to the beams 2, 3, 5 and 6.

The shaft 25 is rotatably journalled in a gear box 26 that is mounted substantially centrally of the supporting frame 1 between two parallel and substantially vertical plates 27 both of which are fastened to the two beams 2 and 3. It has just been explained that each gear box 22 comprises lower and upper relatively parallel and substantially horizontal shafts that are interconnected by meshing pinions. It is possible to replace these meshing pinions by alternative pairs of meshing pinions of different sizes so that the transmission ratio between the two shafts of each pair can be changed. The speed at which the soil working members or rotors 10 will revolve in response to a predetermined input speed of rotation to the implement or harrow can thus be varied without changing that input speed of rotation. The interchangeable pinions are arranged inside a removable screening cover and constitute corresponding change-speed gears 28. A substantially horizontal shaft 29 is rotatably journalled in the gear box 26 so as to extend substantially parallel to the direction A. The leading end of said shaft 29 projects forwardly from the gear box 26 and is splined or otherwise keyed to enable it to be placed in driven connection with the power take-off shaft of an agricultural tractor or other operating vehicle with the aid of an intermediate telescopic transmission shaft of known construction having universal joints at its opposite ends. Drive is transmitted from the shaft 29 to the shaft 25, inside the gear box 26, by suitably arranged bevel pinions (not visible).

The leading beam 2 of the supporting frame 1 is provided with a removable coupling member 30 having coupling points for connection to the free ends of the three-point lifting device or hitch of an operating tractor or other vehicle in the manner which can be seen in outline in FIG. 1 of the drawings. The apex of the generally triangular coupling member 30 is connected, at its rear with respect to the direction A, to rearwardly divergent and downwardly inclined strengthening bars 31 whose lowermost and rearmost ends are secured to the frame beam 6. As can be seen in FIG. 1 of the drawings, the two strengthening bars 31 may be formed integrally. Each of the two hollow frame portions 11 is movable upwardly and downwardly relative to the supporting frame 1, during operation, independently of its fellow and each of its opposite lateral ends carries a corresponding substantially vertical plate 32 (FIG. 4). Arms 33 are connected to the fronts of the plates 32 so as to be pivotable relative thereto about horizontal axes that are substantially parallel to the beams 2, 3, 5 and 6. Each plate 32 is formed adjacent its rearmost edge with a row of holes 35 that are equi-distant from the pivotal mounting of the arm 33 concerned and the arms 33 are themselves formed with single holes that can be brought into selected alignment with chosen ones of the holes 35 by turning the arms upwardly or downwardly about their pivotal mountings. Locking bolts or other locking members are provided for entry through the holes in the arms 33 and through the selected holes 35 to retain said arms temporarily in their chosen angular settings relative to the plates 32.

Each arm 33 is provided, at its rearmost end, with a downwardly inclined bracket 36 whose lowermost end carries a corresponding substantially horizontal bearing. Stub shafts at the ends of two rotatable supporting members 39, in the form of ground rollers, are rotatably received in the bearings which have just been mentioned and each rotatable supporting member or roller 39 comprises a tubular central supporting member 40 (FIG. 4) which carries a plurality of substantially vertical disc-like plates 41 at regular intervals along its length. In the embodiment which is illustrated in the drawings, each member or roller 39 has eight of the plates 41 and these plates 41 are formed around their peripheries with regularly spaced holes 42. Tubular elements 43 are entered through alternate holes 42 so as to extend parllel to the central support 40 as illustrated in the accompanying drawings or, alternatively, so as to extend helically around said support 40. The tubular elements 43 are of circular cross-section and fit with some clearance in the holes 42, transverse "safety" pins which are not shown in the drawings and which it is not necessary to describe being entered through transverse holes in the elements 43 to prevent them from becoming detached from the plates 41.

Each frame portion 11 is provided, adjacent the end thereof that is remote from the other frame portion 11, with a bracket 45 that projects forwardly in substantially the direction A and whose foremost end is bent over outwardly away from the center of the implement or harrow. Each bent-over end carries a corresponding substantially vertical sleeve 46 in which a corresponding substantially vertical shaft 47 is located. The lowermost ends of the shafts 47 project from beneath the sleeves 46 and are provided with corresponding substantially vertically disposed plates 48. Each sleeve 46 has a corresponding spring 49 wound around it, one end of the spring 49 being anchored to the sleeve 46 while the other end 50, which extends substantially rectilinearly parallel to the plate 48 concerned, bears against an arm 51 fastened to a central region of the upper edge of that plate 48 so as to project upwardly therefrom. Each spring end 50 thus urges the corresponding arm 51, and thus the corresponding plate 48, inwardly towards the neighbouring supporting arm 33 of one of the rotatable supporting members or rollers 39.

Pairs of arms 52 which are inclined upwardly and forwardly, with respect to the direction A, are provided in an upper front region of each frame portion 11 at locations towards the opposite ends thereof. Arms 53 are pivotally mounted between the free ends of each pair of arms 52 and extend downwardly therefrom, the two arms 53 that correspond to each frame portion 11 being interconnected at their lowermost ends by a corresponding screening element 54 in the form of a beam or bar L-shaped cross-section. As can be seen in FIGS. 4 and 5 of the drawings, the screening element 54 is located immediately in front, with respect to the direction A, of the connections of the fastening portions of the tines 20 to the tine holders 19, the elements 54 being located at substantially the same level as the tine supports 18. One limb of the generally L-shaped (in cross-section) screening element 54 is inclined downwardly and rearwardly with respect to the direction A from its junction with the other limb while that other limb is inclined upwardly and rearwardly from said junction. Each arm 53 is connected, adjacent its midpoint, to one end of a corresponding helical tension spring 55, said springs 55 extending substantially horizontally parallel to the direction A and having their rear ends secured to the corresponding anchorages 56 at the top and rear of each frame portion 11.

In the use of the soil cultivating implement or harrow that has been described, the common supporting frame 1 is connected to the three-point lifting device or hitch of an operating tractor or other vehicle by the coupling member 30 and the leading end of the rotary input shaft 29 is placed in driven connection with the power take-off shaft of the same tractor or other vehicle by way of the previously mentioned intermediate telescopic transmission shaft of known construction (not illustrated) having universal joints at its opposite ends. Upon driving the rotary input shaft 29, the soil working members or rotors 10 revolve in the directions indicated by arrows in FIG. 1 of the drawings having had the rotation of said shaft 29 transmitted to them through the gear box 26, the shafts 24, the clutches or other couplings 23, the change-speed gears 28, the gear boxes 22 and the pinions 21. The lower soil working portions of the tines 20 move through the ground and work overlapping strips thereof, the distance between the strips worked by the members or rotors 10 at the adjoining ends of the two frame portions 11 being such that those strips will normally at least adjoin one another or be very closely adjacent. The change-speed gears 28 will be provided with pairs of pinions appropriate to the speed of rotation desired for the members or rotors 10 in dependence upon the nature of the soil that is to be worked, its moisture content and other variable operating factors. Similar co-operating pairs of pinions will normally be provided for each change-speed gear 28 but it is noted that this is not absolutely essential and that unusual operating conditions could arise in which it would be preferred for the speeds of rotation of the members or rotors 10 corresponding to each frame portion 11 to be different. The working depth of the tines 20 is controlled by moving the rotatable supporting members or rollers 39 upwardly or downwardly, as necessary, about the pivotal mountings of the arms 33 and entering the locking bolts or other locking members through appropriate holes 35. The screening elements 54 tend to ensure that any stones that are met with during a cultivating or harrowing operation do not come into contact with the connections of the tines 20 to their supports 18 via the holders 19. The lower limbs of the screening elements 54 normally deflect any stones downwardly away from the fastening regions of the tines 20 but the spring-biased pivotal mountings of the two elements 54 enable them to deflect forwardly to avoid damage in the event of a stone or other obstacle becoming momentarily jammed behind one or other of them. the plates 48 at the opposite ends of the row of 24 soil working members or rotors 10 are outwardly deflectable about the substantially vertical axes of the shafts 47 against the resilient opposition of the springs 49. These plates greatly reduce a tendency to the formation of ridges of insufficiently crumbled soil at the margins of the broad strip of land that is worked by the implement or harrow and also act as guards to prevent stones or other hard objects being flung laterally at a dangerous speed by the rapidly rotating tines 20. If a stone or other object should find its way between the tines 20 of the members or rotors 10 at the opposite ends of the row thereof and either of the plates 48, then the plate 48 concerned can deflect around the axis of the corresponding shaft 47 until the stone or the like has been cleared whereafter the affected spring 49 will return the plate 48 to its normal position in which it extends substantially parallel to the direction A. Serious damage to the tines 20, to their mountings or to the plates 48 is thus avoided.

The connection of the two frame portions 11 to the supporting frame 1 by the parallelogram linkages 15 enables each of the two groups of soil working members or rotors 10 to move upwardly and downwardly relative to the supporting frame 1 independently of the other group. Thus, although the implement or harrow which is being described has a working width of substantially 6 meters, the soil working members or rotors 10 can match undulations in the surface of the soil to a satisfactory extent to produce a substantially uniform depth of worked soil throughout the broad strip of cultivated or harrowed ground. This is particularly important when the implement or harrow is in use in the final preparation of seed beds. In order that the frame portions 11 shall occupy stable positions with respect to their own longitudinal axes (i.e. in a substantially horizontal direction substantially perpendicular to the direction A), each of the supports 14 that is closest to the outermost end of the corresponding frame portion 11 has one end of a corresponding stabilising rod 57 connected to it through the intermediary of a ball and socket joint. The opposite ends of the two stabilising rods 57 are similarly connected to the plate-like supports 7 of the frame 1 that are closest to the gear box 26.

The large working width of the implement or harrow makes it inconvenient for it to undergo inoperative transport in a raised position which is otherwise similar to its working position. Accordingly, for transport purposes, a substantially horizontal beam 59 (FIGS. 1, 3, 4 and 5) is provided at one end of the supporting frame 1 and is fastened to the corresponding substantially vertical plate 4. The opposite ends of the beam 59 are provided with downwardly inclined lugs 59A which carry horizontally aligned stub shafts 60. The plate-like support 7 which is closest to the beam 59 is provided at the side thereof remote from said beam 59 with horizontally aligned brackets 61, 61A and 61B (FIG. 4). The brackets 61, 61A and 61B are formed with openings through which are entered horizontal portions 62 of ground wheel supports 63. The horizontal portions 62 can be secured to one another in axial alignment by employing a dowel 62A (FIG. 4) at the end of one of them to co-operate with a socket formed at the end of the other one. Locking pins 62B are employed to retain the dowel 62A in connection with the socket, said pins 62B being located alongside the brackets 61B. The horizontal portions 62 merge by way of 90° bends into downwardly inclined portions 64 which are orientated rearwardly from the portions 62 with respect to the intended direction of inoperative transport travel B which is indicated in FIGS. 3 and 5 of the drawings. Horizontal axle shafts 65 are provided at the lowermost ends of the inclined portions 64 and corresponding transport ground wheels 66 are rotatably mounted on said axle shafts 65. Each inclined portion 64 is pivotally connected to the lowermost end of a corresponding arm 67, the upper and rearmost (with respect to the direction B) ends of said arms 67 being turnably mounted on the substantially horizontally aligned stub shafts 60 carried by the lugs 59A. Quickly releasable "safety" pins which are not shown in the drawings are employed to maintain the connections between the arms 67 and the stub shafts 60.

The substantially vertical plate 4 that is located at the end of the supporting frame 1 remote from the beam 59 has a sleeve 69 rigidly secured to it so as to be entered therethrough. The longitudinal axis of the sleeve 69 is inclined to both the horizontal and the vertical and extends upwardly from the sleeve 69 towards the center of the implement or harrow. A second axially aligned sleeve 69A is provided that is rigidly secured to the supporting frame 1, said sleeves 69 and 69A together receiving a draw bar 70 of tubular construction. The draw bar 70 is axially slidable through the sleeves 69 and 69A and can be retained in any one of at least two different axial settings relative to those sleeves with the aid of a transverse locking pin 71 entered through holes in the sleeve 69A and through co-operating holes 71A in the draw bar 70 itself. The draw bar 70 will usually occupy the position thereof that is indicated in FIG. 6 of the drawings but, when required, it can be moved axially through the sleeves 69 and 69A until the holes 71A that are shown as free in FIG. 6 of the drawings can co-operate with the locking pin 71. The draw bar 70 will then occupy a position in which its front end (with respect to the direction B) is closer to the implement or harrow and is at a higher level. The leading end of the draw bar 70 with respect to the direction B carries a support 72 to which a substantially vertical sleeve 73 is secured. The sleeve 73 is internally screw-threaded and a matchingly screw-threaded spindle having a crank 74 at its upper end is rotatable in the sleeve 73 to move a foot plate 75 at the lower end of the spindle upwardly or downwardly, as required, relative to the sleeve 73 and the draw bar 70. The front of the support 72 relative to the direction B is provided with a towing eye 76 which can be coupled by an upright hitch pin to a tow bar or tool bar mounted between the lower lifting links of a three-point lifting device or hitch of a transporting tractor or other vehicle in the manner illustrated in outline in FIG. 3 of the drawings.

The chains 16 prevent the hollow frame portions 11 from moving too far downwardly relative to the supporting frame 1 during inoperative transport and, after the ground wheel support 63 and the draw bar 70 have been mounted in their operative positions while the implement or harrow is lifted clear of the ground by the three-point lifting device or hitch of an operating tractor or other vehicle, that three-point lifting device or hitch can be lowered to leave the implement or harrow standing upon the ground on the wheels 66 and the foot plate 75. Connection of the towing eye 76 to the tow bar or tool bar of the tractor or other vehicle can then quickly be made employing, when necessary, the crank 74 to bring the towing eye 76 to the correct level for co-operation with the tow bar or tool bar. The whole implement or harrow can then be moved in the direction B in the manner of a two-wheeled cart. It can be seen from FIG. 3 of the drawings that the implement or harrow will negotiate public roads and the like without difficulty since its overall transport width is no greater than the path of travel of an average tractor or other vehicle that is used to tow it.

FIGS. 7 to 10 of the drawings illustrate an alternative construction in which the neighbouring ends of the two frame portions 11 at substantially the center of the implement or harrow are both coupled to a crank 77 (FIG. 8). Bearings 78 are secured to one of the frame portions 11 by brackets 80 and an axially longer bearings 79 is connected to the other frame portion 11 by brackets 81. All three of the brackets 78 and 79 surround the crank 77, the bearing 79 being sandwiched axially between the two bearings 78. The crank 77 is itself pivotally connected to the frame beams 2 and 3 of the supporting frame 1 by substantially horizontally aligned bearings 82. Two further cranks 83 (FIG. 9) interconnect the supporting frame 1 and regions of the two frame portions 11 that are spaced towards the outer ends thereof from the crank 77 (see FIG. 7 of the drawings). Bearings 84 that are rigidly secured to the frame portions 11 surround the center pins of the respective cranks 83, said cranks 83 themselves being turnably connected to the beams 2 and 3 of the supporting frame 1 by substantially horizontal bearings 85 in the same manner as the crank 77. The axis defined by the bearings 82 and the axes defined by the bearings 85 all extend substantially horizontally parallel to the direction A but it will be noticed from FIG. 9 of the drawings that the bearings 85 are slot-shaped so that some movement of the cranks 83 in directions parallel to the lengths of the beams 2 and 3 is possible. These slotted bearings 85 may, if preferred, be replaced by bearings 87 (FIG. 10) in which elastic supporting material 86 surrounds the ends of the cranks 83 in recessed holders. The elastic material 86 thus allows some movement of the cranks 83 in directions substantially parallel to the lengths of the beams 2 and 3.

The cranks 77 and 83 support the frame portions 11 and form parts of a crank mechanism by which two separate but interconnected and substantially adjoining groups of the soil working members or rotors 10 can move upwardly and downwardly relative to the supporting frame 1 to match undulations in the surface of the ground over which those groups move during the use of the implement or harrow. Once again, the soil cultivating implement or rotary harrow may have a total working width of substantially 6 meters. The chains 16 again prevent the frame portions 11 from moving too far downwardly during inoperative transport of the implement or harrow but, in the construction of FIGS. 7 to 10 of the drawings, the provision of the stabilising rods 57 is not required since upward and downward movements of the frame portions 11 also involve some lateral movement thereof with respect to the direction A.

Although various features of the different embodiments of the soil cultivating implement or harrow that has been described and/or illustrated in the accompanying drawings will be set forth in the following claims as inventive features, it is emphasised that the invention is not necessarily limited to those features and that it includes within its scope all of the parts of each embodiment of the implement or harrow that has been described and/or illustrated both individually and in various combinations.

What we claim is:

1. A soil cultivating implement comprising an elongated supporting frame and two groups of soil-working members, each said group being mounted on a corresponding transverse frame portion and each group comprising soil-working members rotatably supported on upwardly extending shafts by said corresponding frame portion, said shafts being arranged in a row and driving means being in driving engagement with the soil-working members of each group, coupling means at the forward side of said elongated supporting frame, said coupling means being connectable to the rear of a prime mover, said supporting frame extending across the transverse width of the implement to bridge said transverse frame portions, said transverse frame portions each being pivotably connected to the supporting frame through parallelogram linkage means, said linkage means making each group independently pivotable with respect to the other group and movable in substantially vertical directions on its corresponding transverse frame portion.

2. An implement as claimed in claim 1, wherein said shafts of said soil-working members are substantially parallel to one another.

3. An implement as claimed in claim 1, wherein said supporting frame is positioned and extends above said frame portions.

4. An implement as claimed in claim 3, wherein each frame portion is connected to said supporting frame by spaced apart parallelogram linkages of said linkage means.

5. An implement as claimed in claim 1, wherein said elongated supporting frame comprises at least two spaced apart frame beams including a foremost beam and a rearmost beam, said parallelogram linkage means together with attaching parts being secured to said foremost beam.

6. An implement as claimed in claim 3, wherein stop means interconnects said frame portions with said frame beams to limit the downward movements of said frame portions relative to said supporting frame.

7. An implement as claimed in claim 1, wherein each frame portion is adjustably connected to ground engaging means that controls the working depth of the corresponding group of soil-working members.

8. An implement as claimed in claim 7, wherein said ground engaging means comprises rotatable members that are positioned to the rear of said implement.

9. An implement as claimed in claim 8, wherein each rotatable member is pivotably mounted and pivotable in upward and downward directions.

10. An implement as claimed in claim 9, wherein each rotatable member is connected to a frame portion at the rear of said soil-working members.

11. An implement as claimed in claim 1, wherein said driving means includes a transmission gear positioned substantially centrally on said implement.

12. An implement as claimed in claim 11, wherein said transmission gear comprises a substantially centrally mounted gear box and telescopic shafts extending laterally therefrom to further gear boxes carried by the said frame portions that correspond to said groups of soil-working members.

13. An implement as claimed in claim 12, wherein said driving means includes a slip clutch.

14. An implement as claimed in claim 12, wherein said driving means includes a change-speed gear.

15. An implement as claimed in claim 1, wherein said soil-working members each includes at least one downwardly extending tine that is offset with respect to its corresponding shaft whereby the paths traced by tines of rotating adjacent soil-working members overlap each other during operation.

16. An implement as claimed in claim 1, wherein upright plates are pivotably connected to said implement adjacent the opposite ends of said groupds and said plates are pivotable about substantially vertical axes.

17. An implement as claimed in claim 1, wherein said supporting frame has connections for receiving means that convert the implement to an inoperative transport position and said elongated supporting frame is positionable with its longitudinal axis extending substantially parallel to the direction of travel.

18. A soil-cultivating implement comprising an elongated supporting frame and two groups of soil-working members, each said group being mounted on a corresponding transverse frame portion and each group comprising soil-working members supported for rotation about substantially vertical axes on upwardly extending shafts by said corresponding frame portion, said shafts being arranged in a row and driving means being in driving engagement with the soil-working members of each, coupling means at the forward side of said elongated supporting frame, said coupling means being connectable to the rear of a prime mover, said supporting frame extending across the transverse width of the implement to bridge said transverse frame portions, said transverse frame portions each being pivotably connected to the supporting frame through crank means and said crank means making each group independently pivotable with respect to the other group and movable in substantially vertical directions on its corresponding transverse frame portion.

19. An implement as claimed in claim 18, wherein said frame portions are each interconnected to spaced apart beams of said supporting frame through said crank means.

20. An implement as claimed in claim 19, wherein said crank means comprise at least two relatively spaced apart cranks that interconnect said beams with each of said frame portions.

21. An implement as claimed in claim 20, wherein at least one crank of said crank means is pivotably connected to said beams with brackets having coupling connections.

22. An implement as claimed in claim 21, wherein said coupling connections are movable along slots in said brackets.

23. An implement as claimed in claim 21, wherein said coupling connections are movable against the opposition of bearings made of elastic material and said bearings are located in said brackets.

24. An implement as claimed in claim 18, wherein said cranks are turnable in bracket means on said implement, the axes about which cranks of said crank means are turnable extending substantially parallel to the direction of travel.

25. An implement as claimed in claim 18, wherein said frame portions have adjacent inner ends which are connected to a common crank of said crank means.

26. An implement as claimed in claim 25, wherein said common crank is turnably connected to said supporting frame at locations adjacent the front and rear of the latter with respect to the direction of travel.

27. A soil cultivating implement comprising an elongated supporting frame and two groups of soil-working members supported on said frame, each of said groups having soil-working members rotatably mounted on upwardly extending shafts in a row and said shafts being journalled in said implement, driving means interconnecting the soil-working members of said groups, coupling means at the forward side of said implement and said coupling means being connectable to the rear of a prime mover, said supporting frame including a plurality of spaced apart beams that extend across the width of the implement to bridge said groups of soil-working members, said groups each being connected to said frame by linkage means for independently supporting said groups from said frame, said linkage means including spaced apart parallel linkages on each group and stabilizing rods interconnecting said linkages.

28. A soil cultivating implement comprising an elongated, substantially rigid supporting frame and a plurality of soil-working members rotatably mounted in a row on said frame, said frame extending substantially transverse to the direction of travel, driving means interconnecting said soil-working members and coupling means secured to said frame substantially centrally thereof for attachment at the rear of a prime mover for cultivating operation, towing means on said implement adjacent one end of said frame for detachably receiving a transport structure and said implement being connectable to said prime mover with said structure and positionable in a transport position in which the longitudinal axis of said frame is located generally parallel to the direction of travel, said towing means comprising a first mounting having quick release means that detachably receives transport ground wheels and supporting means for said wheels, said first mounting being located adjacent one end of said frame and said towing means including a second mounting that detachably receives a draw bar at the opposite end of said frame, said draw bar having a front end that is adjustably connected to a ground support, said ground support having foot plate means that normally rests on the ground, said supporting means for the ground wheels comprising two detachable ground wheel supports, each ground wheel support including a substantially horizontal portion that is fixable in place relative to said supporting frame and a downwardly extending portion that is connectable to said supporting frame by pivotal arm means, the downwardly extending portion of each ground wheel support being inclined downwardly and rearwardly from said horizontal portion with respect to the normal direction of travel during transport, a horizontal beam support being connected to said frame and the ends of said beam support receiving said pivotal arm means.

* * * * *